United States Patent
Rodway et al.

(10) Patent No.: US 11,220,995 B2
(45) Date of Patent: Jan. 11, 2022

(54) ROTOR FOR A VERTICAL AXIS WIND TURBINE

(71) Applicant: Spinetic Energy Limited, Chippenham Wiltshire (GB)

(72) Inventors: Giles Henry Rodway, Wiltshire (GB); Jeremy Martin Andres Bigg, Surrey (GB); Kurt Joseph Joachim, Wiltshire (GB)

(73) Assignee: Spinetic Energy Limited, Chippenham (GB)

( * ) Notice: Subject to any disclaimer, the term of this patent is extended or adjusted under 35 U.S.C. 154(b) by 106 days.

(21) Appl. No.: 16/637,066

(22) PCT Filed: Jul. 31, 2018

(86) PCT No.: PCT/GB2018/052178
§ 371 (c)(1),
(2) Date: Feb. 6, 2020

(87) PCT Pub. No.: WO2019/030499
PCT Pub. Date: Feb. 14, 2019

(65) Prior Publication Data
US 2020/0240392 A1 Jul. 30, 2020

(30) Foreign Application Priority Data

Aug. 7, 2017 (GB) ..................................... 1712625
Aug. 7, 2017 (GB) ..................................... 1712649

(51) Int. Cl.
*F03D 3/00* (2006.01)
*F03D 3/06* (2006.01)
*F03D 7/06* (2006.01)

(52) U.S. Cl.
CPC ............. *F03D 3/005* (2013.01); *F03D 3/061* (2013.01); *F03D 3/062* (2013.01); *F03D 7/06* (2013.01);
(Continued)

(58) Field of Classification Search
CPC .......... F03D 3/005; F03D 3/061; F03D 3/062; F03D 3/06
See application file for complete search history.

(56) References Cited

U.S. PATENT DOCUMENTS

| 1,697,574 A | 1/1929 | Savonius |
| 4,005,947 A * | 2/1977 | Norton .................... F03D 3/007 416/197 A |

(Continued)

FOREIGN PATENT DOCUMENTS

| CN | 106640518 A | 5/2017 | |
| DE | 102015002435 A1 * | 9/2016 | ............. F03D 3/061 |

(Continued)

OTHER PUBLICATIONS

UK Search Report for Application GB1712649.1 dated Jan. 10, 2018.
(Continued)

*Primary Examiner* — Justin D Seabe
*Assistant Examiner* — Ryan C Clark
(74) *Attorney, Agent, or Firm* — Honigman LLP

(57) ABSTRACT

There is described a rotor for a vertical axis wind turbine comprising: first and second blades connected to one another and arranged to rotate around an axis; wherein the first and second blades are disposed 180° apart with respect to one another and are offset from the axis in a radial direction; wherein an inner edge of each blade is spaced radially inwardly from an outer edge of the opposing blade to form a pair of diametrically opposed openings which open in
(Continued)

opposite directions; wherein each of the first and second blades comprises a first curved section and a second oppositely curved section, the first and second curved sections being separated by a point of inflection; and wherein the first and second curved sections of the first and second blades overlap one another to form a passageway between the first and second blades which extends between the openings.

20 Claims, 14 Drawing Sheets

(52) U.S. Cl.
CPC ... *F05B 2240/213* (2013.01); *F05B 2240/301* (2013.01)

(56) References Cited

U.S. PATENT DOCUMENTS

| | | | |
|---|---|---|---|
| 4,715,776 A | | 12/1987 | Benesh |
| 5,494,407 A | * | 2/1996 | Benesh ............... F03D 3/005 |
| | | | 416/197 A |
| 7,948,110 B2 | * | 5/2011 | Morgan ............... F03D 3/005 |
| | | | 290/55 |
| 2006/0222483 A1 | * | 10/2006 | Seiford, Sr. ............ F03D 3/061 |
| | | | 415/4.4 |
| 2007/0104582 A1 | * | 5/2007 | Rahai .................... F03D 3/061 |
| | | | 416/197 A |
| 2015/0110627 A1 | * | 4/2015 | Kim ....................... F03D 3/061 |
| | | | 416/197 A |
| 2016/0222942 A1 | * | 8/2016 | Fox ........................ F03D 3/061 |
| 2017/0138344 A1 | * | 5/2017 | Guignard ............... F03D 3/067 |

FOREIGN PATENT DOCUMENTS

| | | | | |
|---|---|---|---|---|
| JP | S57135274 A | | 8/1982 | |
| JP | 60145464 A | * | 1/1984 | ............... F03D 3/06 |
| JP | S60145464 A | | 7/1985 | |
| KR | 20130016445 A | | 2/2013 | |
| KR | 20130016446 A | | 2/2013 | |
| NZ | 264780 A | | 9/1997 | |
| WO | WO-2006108612 A1 | | 10/2006 | |

OTHER PUBLICATIONS

UK Combined Search Exam Report for Application GB1812430.5 dated Jan. 18, 2019.
International Search Report for Application PCT/GB2018/052178 dated Nov. 2, 2018.

* cited by examiner

| Blade designation: | A (Benesh) | B | C | D | E | F | G | H | I | J |
|---|---|---|---|---|---|---|---|---|---|---|
| Shape of central blade portions | | | | | | | | | | |
| C1radius/C1swept radius | ∞ | 4.49 | 3.08 | 2.37 | 2.08 | 1.84 | 1.61 | 1.50 | 1.30 | 0.94 |
| C2radius/C1swept radius | ∞ | 4.05 | 2.66 | 1.98 | 1.67 | 1.44 | 1.23 | 1.13 | 0.91 | 0.57 |
| C1radius/cylinder radius | ∞ | 3.32 | 2.32 | 1.83 | 1.62 | 1.45 | 1.34 | 1.20 | 1.07 | 0.82 |
| C2radius/cylinder radius | ∞ | 3.00 | 2.00 | 1.53 | 1.30 | 1.13 | 1.02 | 0.92 | 0.75 | 0.50 |
| Power output vs Benesh Blade (A) | 1.000 | 1.055 | 1.120 | 1.099 | 1.127 | 1.158 | 1.090 | 1.027 | 0.995 | 0.550 |

FIG. 14

ROTOR FOR A VERTICAL AXIS WIND TURBINE

CROSS REFERENCE TO RELATED APPLICATIONS

This U.S. patent application is a national phase application of International Application No. PCT/GB2018/052178, filed on Jul. 31, 2018, which claims priority to earlier-filed Great Britain Patent Application No. GB 1712649.1, filed on Aug. 7, 2017, and earlier-filed Great Britain Patent Application No. GB 1712625.1, filed on Aug. 7, 2017. The disclosures of these prior applications are considered part of the disclosure of this application and are hereby incorporated by reference in their entireties.

FIELD

The invention relates to a rotor for a vertical axis wind turbine.

BACKGROUND

Vertical axis wind turbines (VAWTs) possess a number of intrinsic advantages over horizontal axis wind turbines (HAWTs). These include the fact that VAWTs are equally effective at capturing wind from any horizontal direction, without having to be oriented into the wind. They are also capable of driving generators whose rotation axis is fixed, meaning that such generators do not have to be built to withstand yawing forces (as they do with HAWTs), and the generators may be more conveniently located for servicing (e.g. mounted on the ground, driven by a VAWT mounted directly above them).

VAWTs are, however, generally of lower overall efficiency than HAWTs, meaning that for a given swept area, a VAWT typically converts less wind power to mechanical or electrical power than a HAWT.

Many different rotor designs and blade shapes have been proposed for use in VAWTs, in order to improve this conversion efficiency. Typical "high efficiency" blade shapes are essentially aerofoils, relying on the lift forces generated by the wind passing over rapidly rotating blades, to extract power from the wind. Examples of such turbines are "Darreius" or "Gorlov" turbines. These designs, however, are relatively expensive to construct, and usually are not "self-starting", therefore requiring an external means (e.g. an electric motor) to initiate rotation until the blades reach "lift mode". Due to their high rotation rates, such blades are also subject to high fatigue forces in use which can lead to premature blade failure.

Another family of VAWT blade designs also exists which typically consist of two or three blade shells or "buckets", blades often being semi-circular in cross-section and made from sheet material. These are often termed Savonius-type blades, after their original inventor, Sigurd Johannes Savonius (see, e.g. U.S. Pat. No. 1,697,574). Power is extracted from the wind via a combination of lift and drag forces on the blades. Savonius and related VAWTs tend to be of lower maximum efficiency than pure aerofoil blades, but are usually self-starting with wind from any direction (and so do not need an external starter), and are simpler, cheaper to construct, and more robust in high winds than Darreius type or similar VAWTs. FIG. 1A (taken from U.S. Pat. No. 5,494,407) shows a rotor designed by Alvin Benesh which has one of the highest efficiencies for turbines of this type. The rotor is a two-bladed design comprising a characteristic planar, parallel sided central section. Although easy to construct and relatively efficient, this blade has the disadvantage that the flat sections are very visible when the blade turns in the wind (especially if the blade material is even slightly reflective) making visual "flicker" very noticeable with such turbines in use. Furthermore, the flat, parallel-sided central section is more prone to buckling in strong winds limiting the robustness of the design. Known designs incorporating curved sections, such as that shown in FIG. 1B (taken from U.S. Pat. No. 4,715,776), which might overcome the above limitations, suffer from lower efficiency.

It is therefore desirable to provide a rotor for a vertical axis wind turbine which addresses some or all of the issues mentioned above.

SUMMARY

In accordance with an aspect of the invention there is provided a rotor for a vertical axis wind turbine comprising: first and second blades connected to one another and arranged to rotate around an axis; wherein the first and second blades are disposed 180° apart with respect to one another and are offset from the axis in a radial direction; wherein an inner edge of each blade is spaced radially inwardly from an outer edge of the opposing blade to form a pair of diametrically opposed openings which open in opposite directions; wherein each of the first and second blades comprises a first curved section and a second oppositely curved section, the first and second curved sections being separated by a point of inflection; and wherein the first and second curved sections of the first and second blades overlap one another to form a passageway between the first and second blades which extends between the openings; wherein each of the first and second curved sections has a radius of curvature which is greater than or equal to the radius of the cylindrical volume swept by the first curved sections.

Each of the first and second curved sections has a radius of curvature which is greater than or equal to the radius of the maximum cylindrical volume swept by the blades The passageway may have a uniform width along its length.

The point of inflection of the first blade, the point of inflection of the second blade and the axis of rotation may be aligned.

The first curved section may have a radius of curvature which is greater than the radius of curvature of the second curved section.

The difference between the radius of curvature of the first curved section and the radius of curvature of the second curved section may correspond to a distance between the blades.

The first curved section may have a radius of curvature of between 1 and 4.5 times the radius of the cylindrical volume swept by the first curved sections.

The first curved section may have a radius of curvature of between 1.5 and 4.5 times the radius of the cylindrical volume swept by the first curved sections.

The first curved section may have a radius of curvature of between 1.6 and 3.1 times the radius of the cylindrical volume swept by the first curved sections.

The first curved section may have a radius of curvature of 1.84 times the radius of the cylindrical volume swept by the first curved sections.

The first curved section may have a radius of curvature of between 1r and 3.5r, where r is the radius of the cylindrical volume swept by the blades.

The first curved section may have a radius of curvature of between 1.2r and 3.3r.

The first curved section may have a radius of curvature of between 1.3r and 2.3r.

The first curved section may have a radius of curvature of 1.45r.

The second curved section may have a radius of curvature of between 1 and 4.5 times the radius of the cylindrical volume swept by the first curved sections.

The second curved section may have a radius of curvature of between 1.1 and 4 times the radius of the cylindrical volume swept by the first curved sections.

The second curved section may have a radius of curvature of between 1.2 and 2.7 times the radius of the cylindrical volume swept by the first curved sections.

The second curved section may have a radius of curvature of 1.44 times the radius of the cylindrical volume swept by the first curved sections.

The second curved section may have a radius of curvature of between 0.9r and 3r.

The second curved section may have a radius of curvature of between 1r and 2r.

The second curved section may have a radius of curvature of 1.13r.

The blades may be spaced by a distance of between 0.25r and 0.4r. The blades may be spaced by a distance of 0.32r.

Each blade may comprise an outer section which extends from the outer edge towards the first curved section, the outer section extending circumferentially about the rotor.

The outer section may have an arc length of between 10 and 25 degrees.

The outer section may have an arc length of 17 degrees.

The outer section may be connected to the first curved section via a transition section which may have a radius of curvature of between 0.1r and 0.5r.

The transition section may have a radius of curvature of 0.3r.

The inner edge may be located at a distance of between 0.5 and 0.8r from the axis of rotation. The inner edge may be located at a distance of 0.65r from the axis of rotation.

In accordance with another aspect of the invention there is provided a turbine comprising a rotor as described above and a generator coupled to the rotor.

DRAWINGS

For a better understanding of the invention, and to show more clearly how it may be carried into effect, reference will now be made, by way of example, to the accompanying drawings, in which.

Figure 1A:
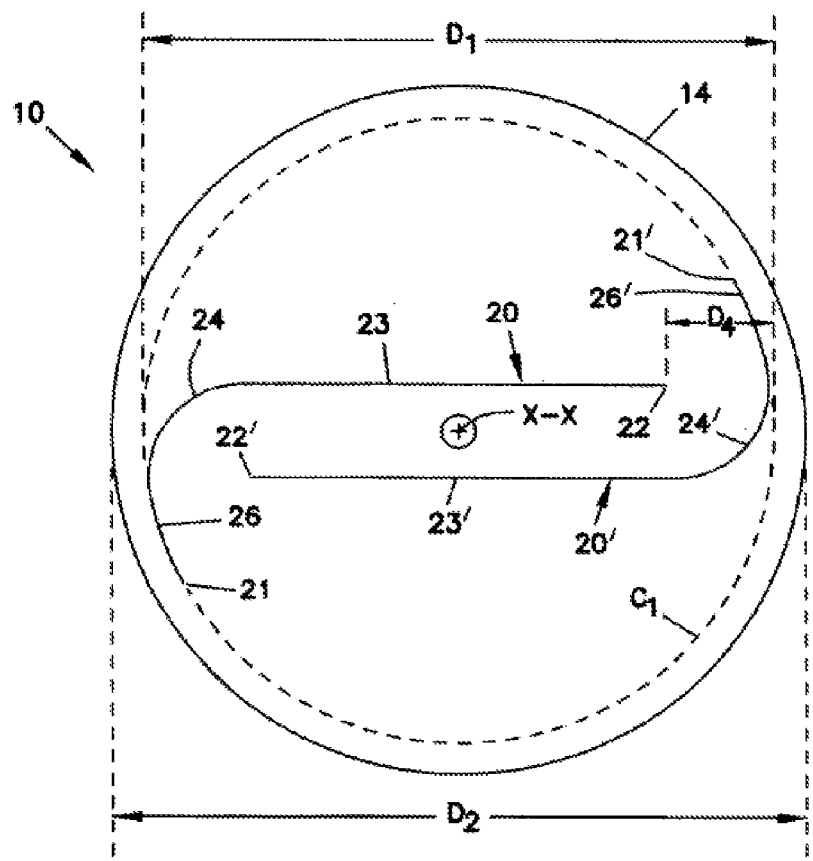
FIGS. 1A and 1B show prior art rotor designs.
Figure 1B:
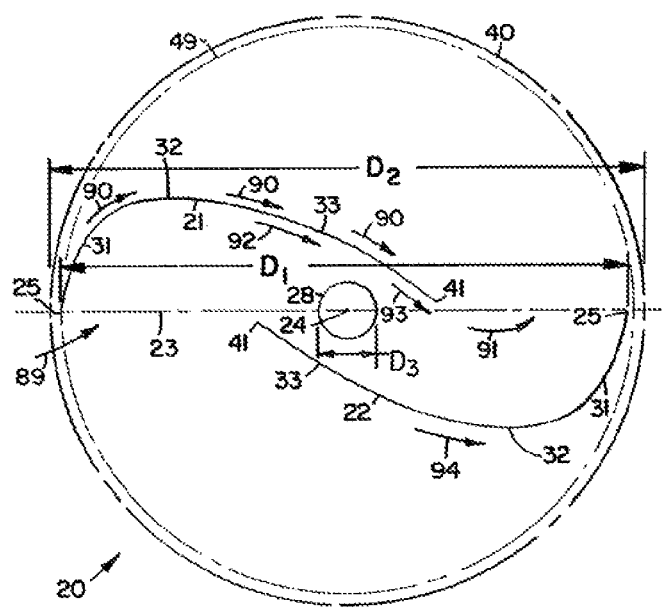
Figure 13:
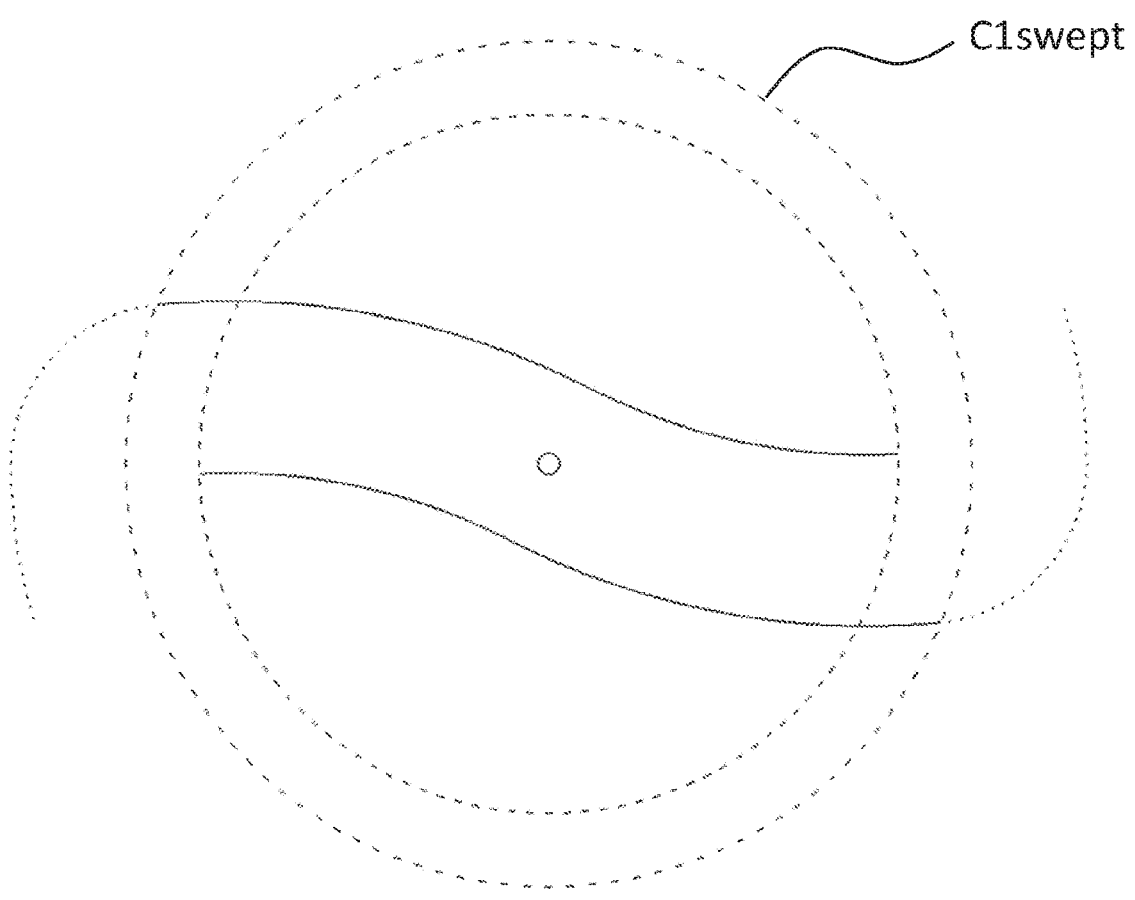

FIG. 13 provides an illustration of the swept radius of the first overlap portion; and FIG. 14 shows a table of exemplary rotor profiles and their performance versus the prior art rotor of FIG. 1A.

DETAILED DESCRIPTION

Figure 2:
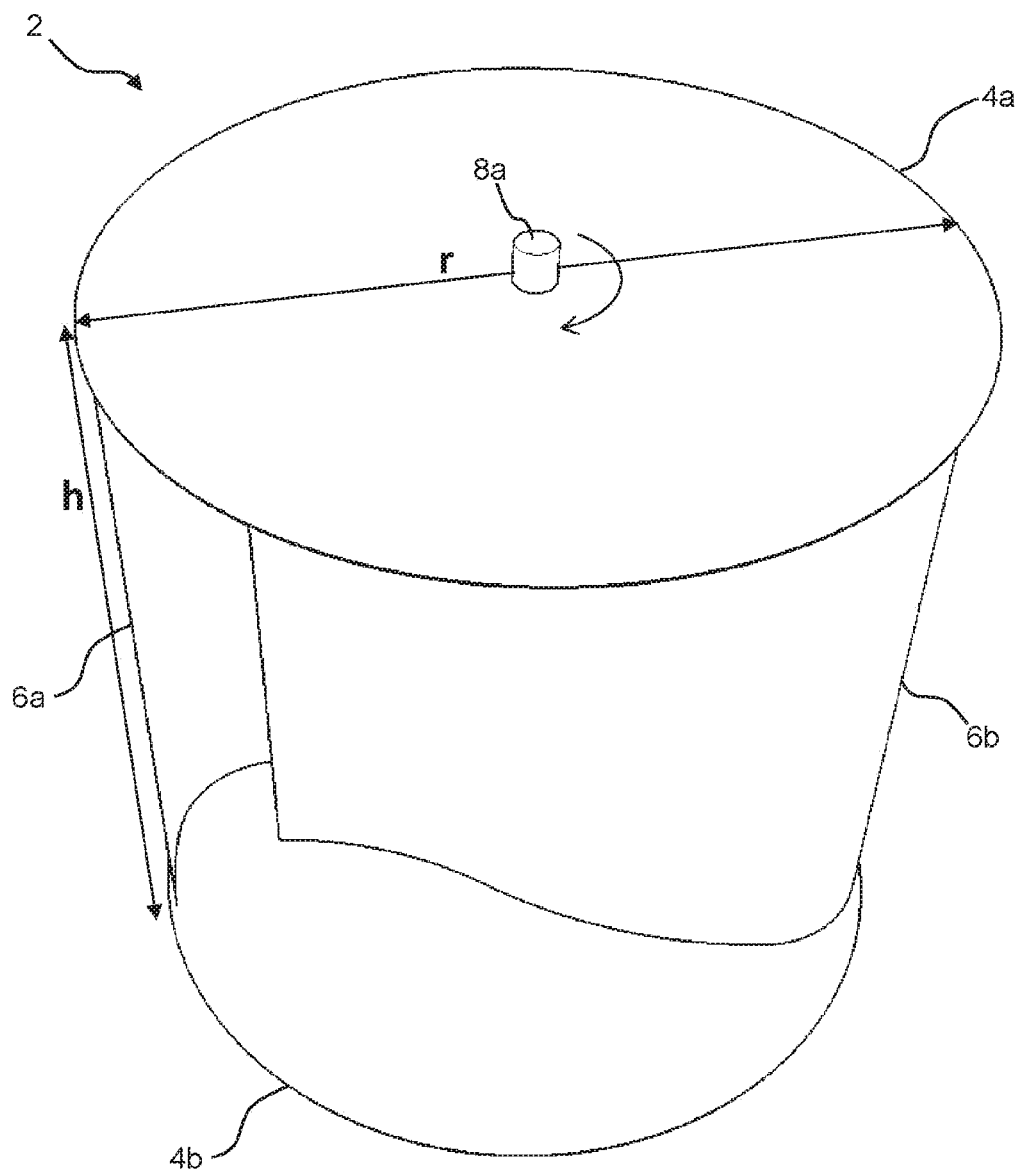
FIG. 2 is a perspective view of a rotor according to an embodiment of the invention.

FIG. 2 shows a rotor 2 according to an embodiment of the invention. The rotor generally comprises a pair of circular end caps 4a, 4b which are parallel to one another such that their centers are aligned on a common axis but spaced apart by a pair of blades 6a, 6b which extend between the end caps 4a, 4b. The rotor 2 has a radius r and a height h. Each of the end caps 4a, 4b is provided with a shaft 8a (the opposing shaft of the end cap 4b is not visible in FIG. 2) which enable the rotor 2 to be rotatably mounted via suitable bearings.

Figure 3:
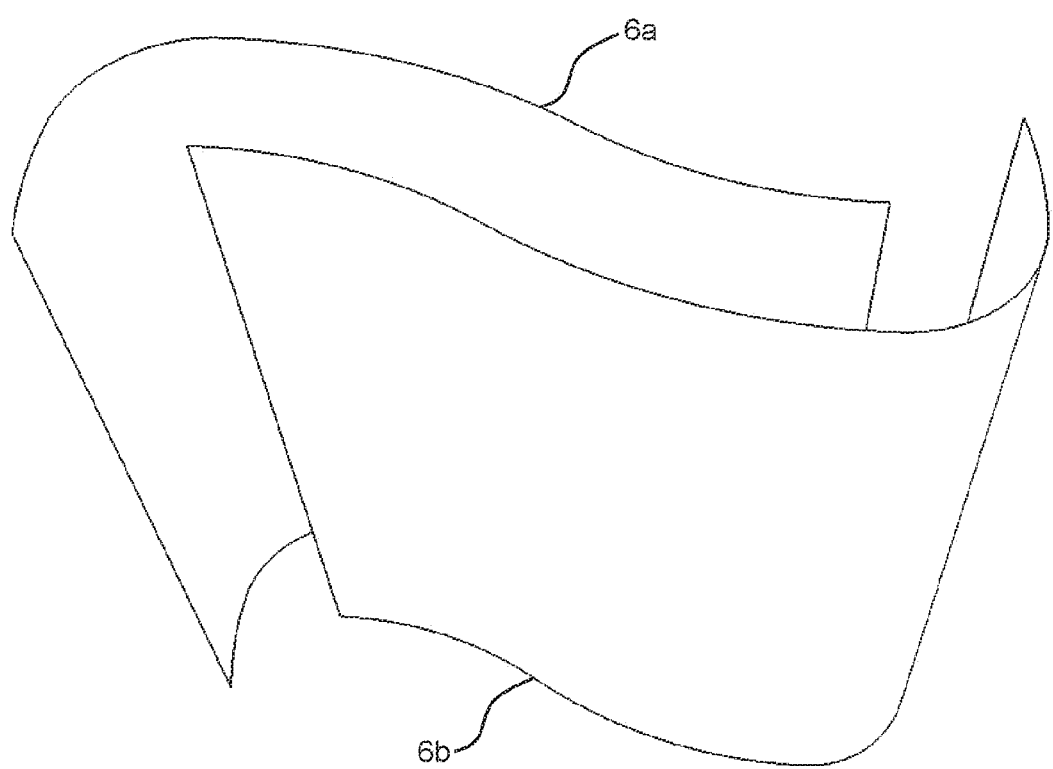
FIG. 3 is a perspective view showing the blades of the rotor with the end caps removed for clarity.
Figure 4:
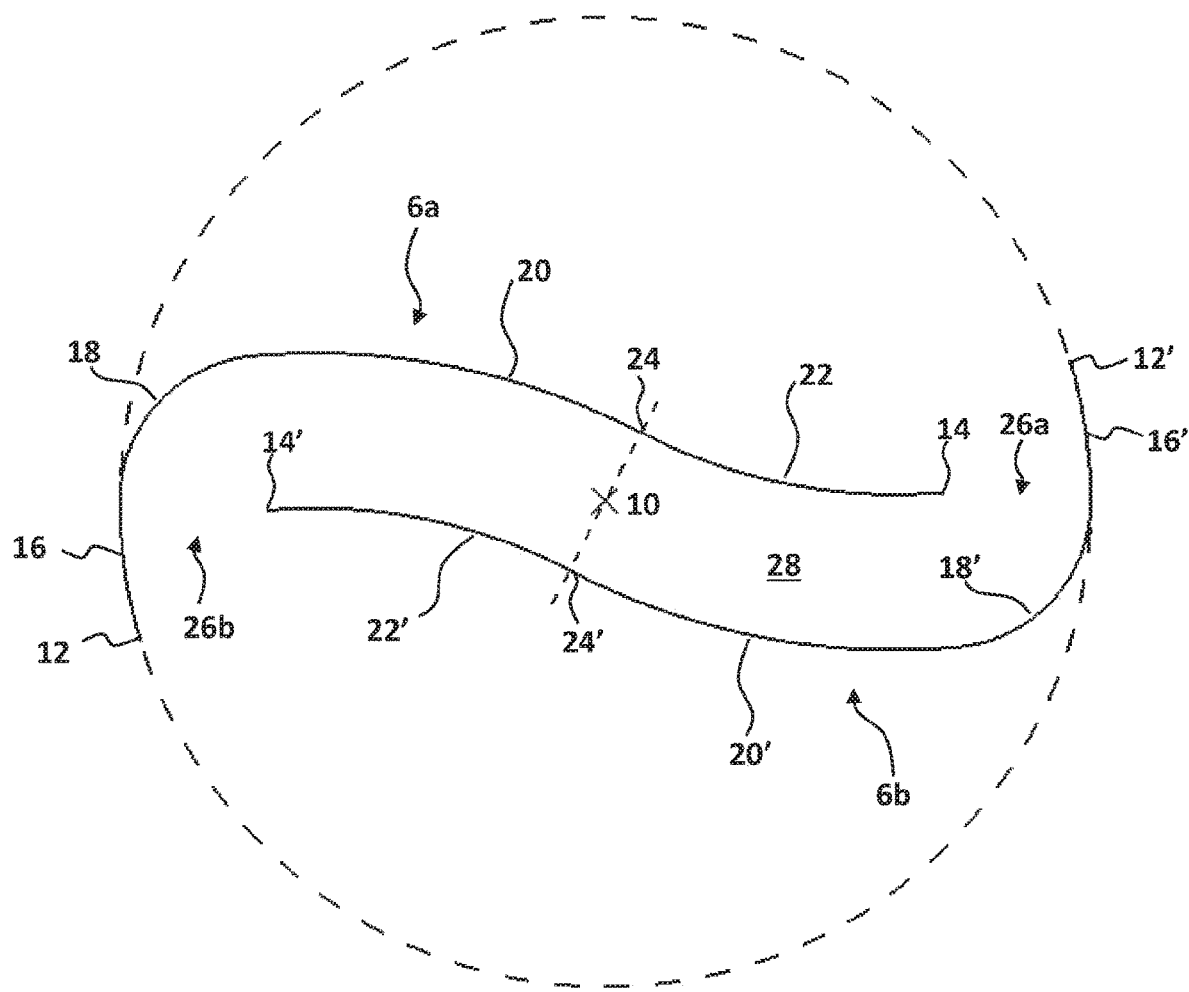
FIG. 4 is a cross-sectional view of the rotor.

As shown in FIGS. 3 and 4, the blades 6a, 6b are essentially identical, but one is rotated 180 degrees relative to the other about the axis 10 and offset from it by equal distances in opposing radial directions.

The features of blade 6a will now be described; however, it will be appreciated that blade 6b includes corresponding features which are denoted by the same reference numerals, but distinguished using the prime symbol.

Blade 6a includes an outer edge 12 and an inner edge 14. Between the outer and inner edges 12, 14, the blade 6a is profiled to form, in series, an outer section 16, a transition section 18, a first overlap section 20 and a second overlap section 22.

As shown, the outer section 16 follows the curvature of the end caps 4a, 4b and thus extends circumferentially and with a radius of curvature r. The outer section 16 and outer edge 12 are therefore located on a circle of radius r. The blade 6a curves inwards towards the axis 10 over the transition section 18. The first and second overlap sections 20, 22 are both curved, but are curved in opposite directions, such that one may be considered convex and the other concave. The first and second overlap sections 20, 22 are therefore separated by a point of inflection 24 and form an S-shaped or sigmoidal (although not necessarily in accordance with the mathematic definition) curve. The first overlap portion 20 has a radius of curvature which is greater than the radius of curvature of the second overlap portion 22. The blade 6a terminates at the inner edge 14 which is located radially inward of the edge of the end caps 4a, 4b.

As described above, the blades 6a, 6b are rotated 180 degrees relative to one another and offset from it by equal distances in opposing radial directions. With this arrangement, the inner edge 14, 14' of edge blade 6a, 6b is spaced inwards from the outer section 16, 16' of the opposing blade 6a, 6b to form two openings 26a, 26b which are diametrically opposed of one another and which open in opposite directions. The outer section 16, 16' of each blade 6a, 6b projects circumferentially beyond the inner edge 14, 14' of the opposing blade 6a, 6b. The first and second overlap sections 20, 22 of the first blade 6a overlap the first and second overlap sections 20', 22' of the second blade 6b overlap and run parallel to one another. The first and second overlap sections 20, 20', 22, 22' therefore define a channel or passageway 28 of uniform width which connects the first and second openings 26a, 26b located at either end. The passageway 28 thus also has an S-shaped or sigmoidal curve. The point of inflection 24, 24' of the first and second blades 6a, 6b are located on opposite sides of the passageway 28 and form a line with the axis 10.

The geometry of the rotor 2 will be further described below with reference to FIGS. 5 to 10 which present a geometrical construction of the blades 6a, 6b.

Figure 5:
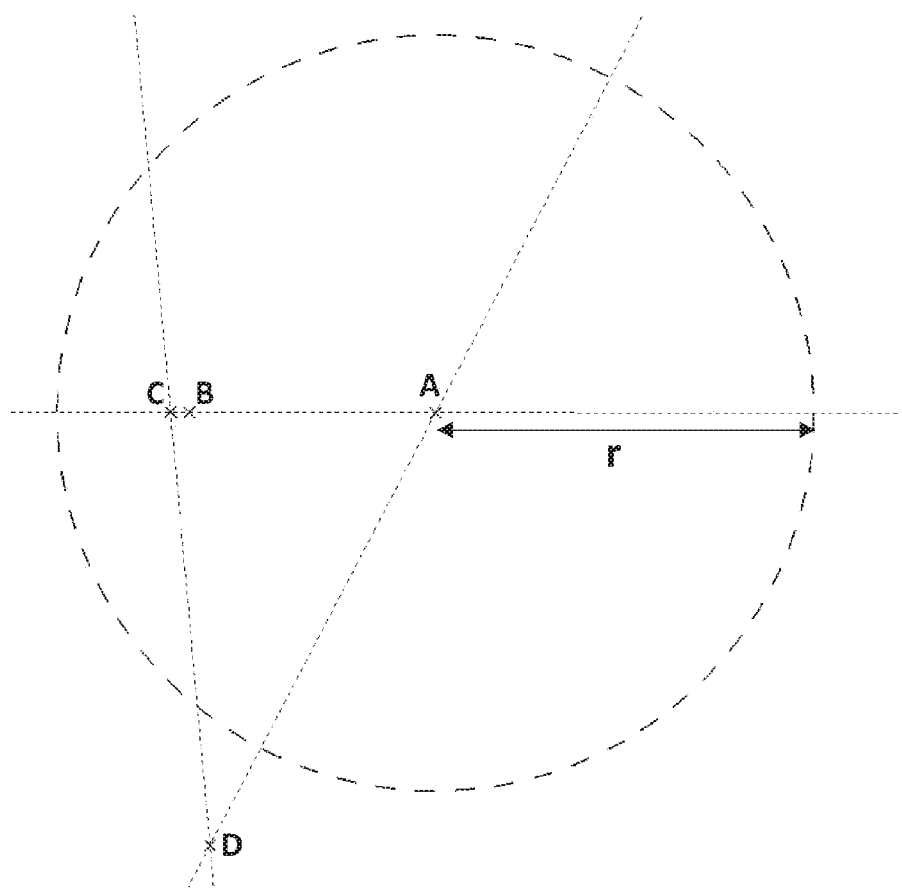
FIGS. 5 to 10 depict a geometrical description of the shape of the blades.

Referring first to FIG. 5, to provide reference positions for construction lines and portions of the blade, four points are initially defined with respect to the circle, of radius r, which itself defines the cross-sectional shape of the rotor 2 and its swept cylinder.

Specifically:

Point A is at the center of the circle;

Point B lies within the circle, at a distance 0.65r horizontally displaced from point A;

Point C lies within the circle, at a distance 0.7r horizontally displaced from point A; and Point D lies outside the circle, at a distance of 1.29r from point A, and 1.15r from point C.

It can be seen that points A-D all lie on a triangle, whose sides are of length 0.7r, 1.29r and 1.15r. Points A, C and D are the vertices of that triangle, and point B lies on the shortest side of the triangle (i.e. directly between point A and point C) at a distance of 0.65r from point A.

Figure 6:
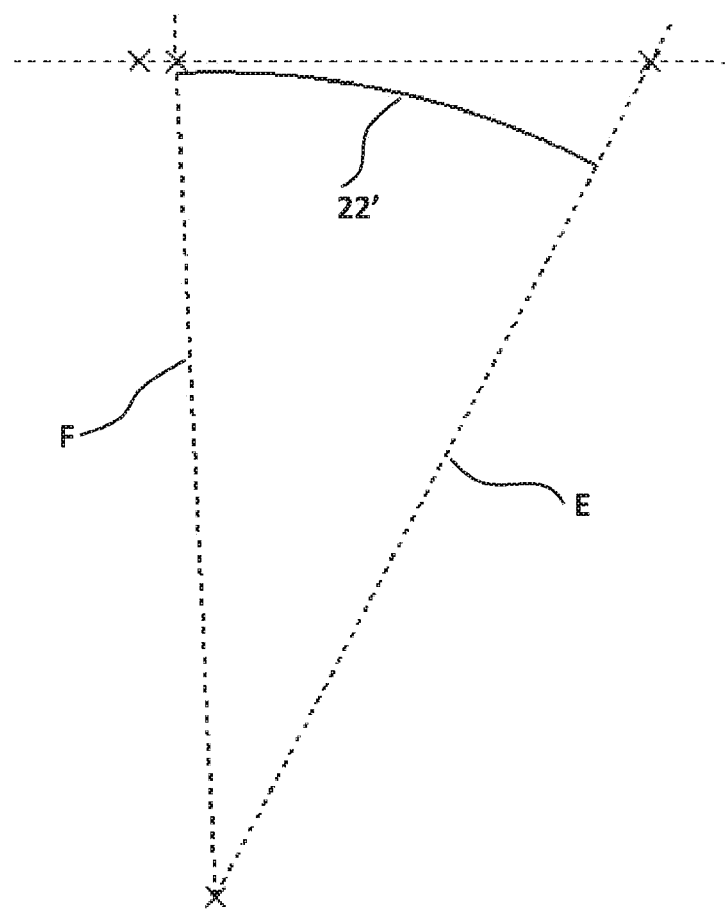

As shown in FIG. 6, a construction line E is defined which passes through points A and D and a construction line F is defined which passes through points B and D. The second overlap section 22' of the second blade 6b is formed as an arc of a circle, radius 1.13r, centered on point D, and lying between construction lines E and F (such that the second overlap section 22' is at a distance of 0.16r from point A at its closest point).

Figure 7:
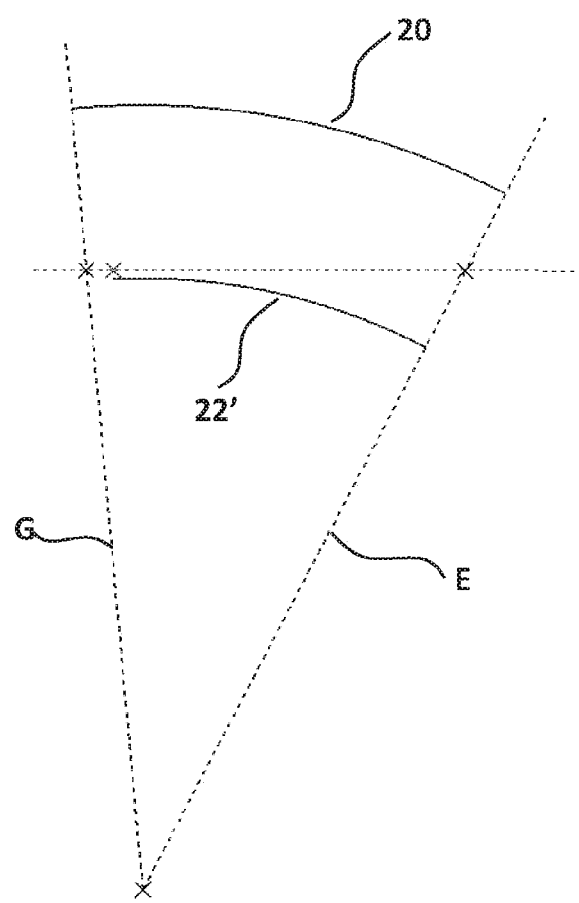

As shown in FIG. 7, a further construction line G is defined which passes through points C and D. The first overlap section 20 of the first blade 6a is formed as an arc of a circle, radius 1.45r, also centered on point D, but lying between construction lines E and G (such that the first overlap section 20 is at a distance of 0.16r on the other side of point A at its closest point).

Figure 8:
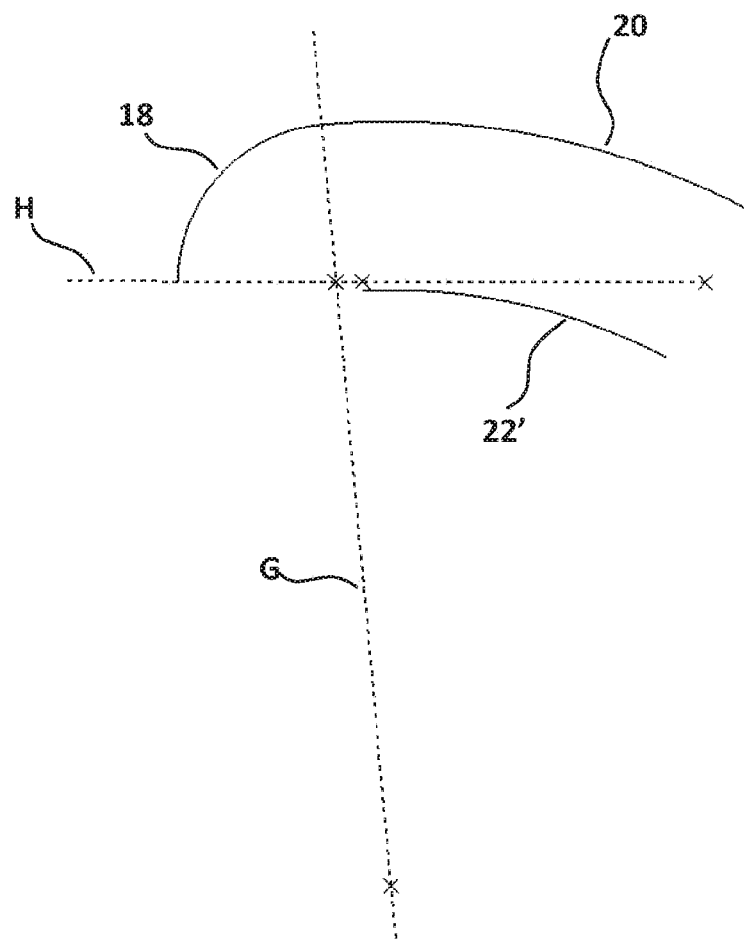

As shown in FIG. 8, a further construction line H is defined which passes through points A, B and C. The transition section 18 of the first blade 6a is formed as an arc of a circle, radius 0.3r, centered on point C, lying between construction lines G and H, such that it joins the first overlap section 20.

Figure 9:
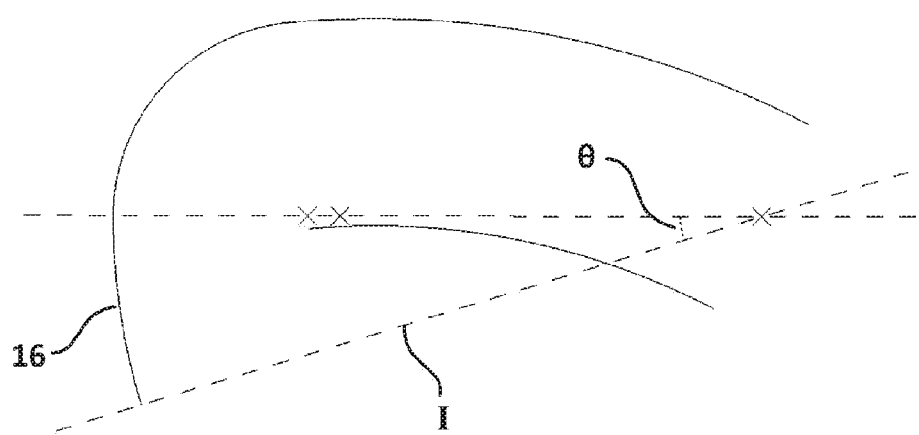

As shown in FIG. 9, a further construction line I is defined which passes through point A, at an angle (θ in FIG. 9) of 17° to line H. The outer section 16 is formed as an arc of a circle, radius r, lying between construction lines H and I, such that it joins the transition section 18.

Figure 10:
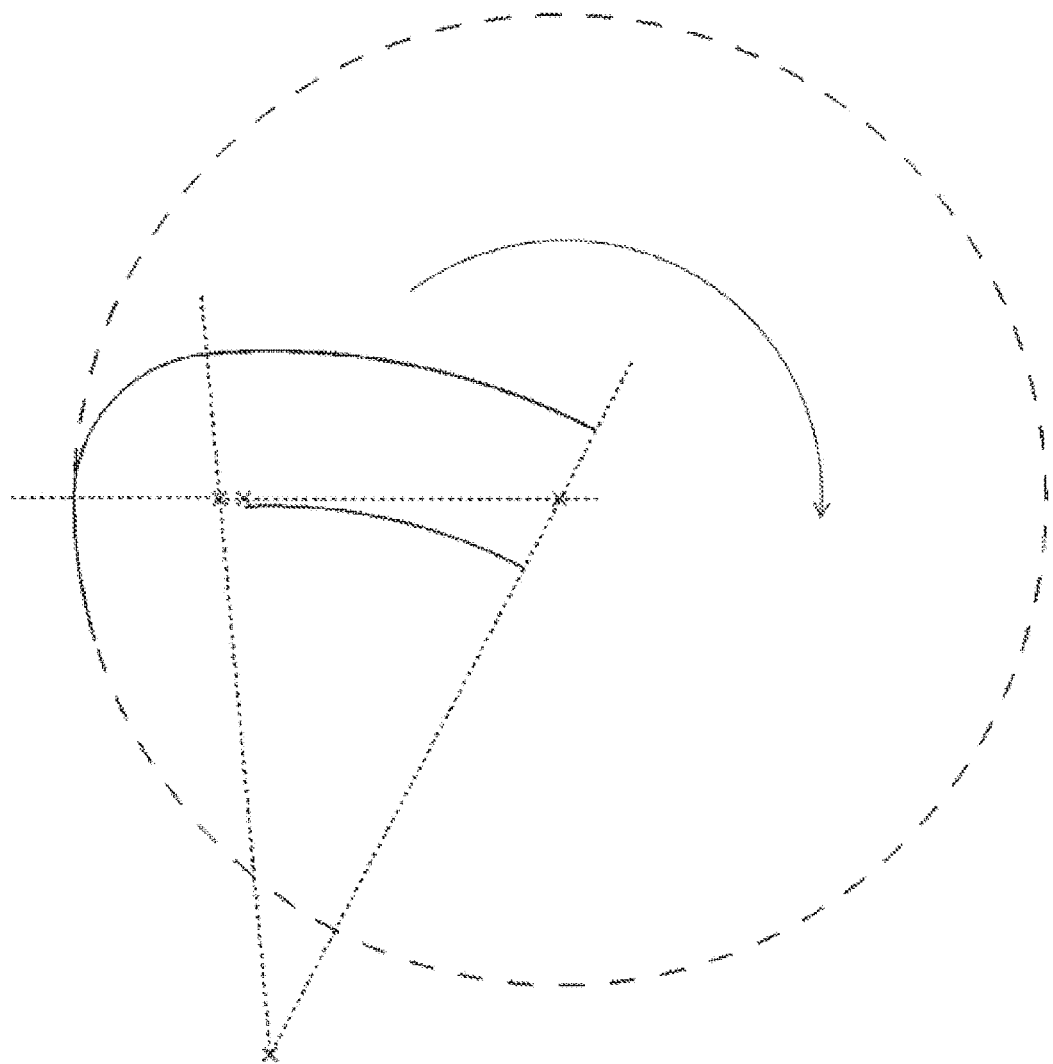

The above steps collectively define the cross-sectional shape of half of the rotor 2. As shown in FIG. 10, each of the sections formed as described above may be rotated about point A by 180° to form the remaining sections of the blades 6a, 6b, as described above and shown in FIG. 4.

Figure 11:
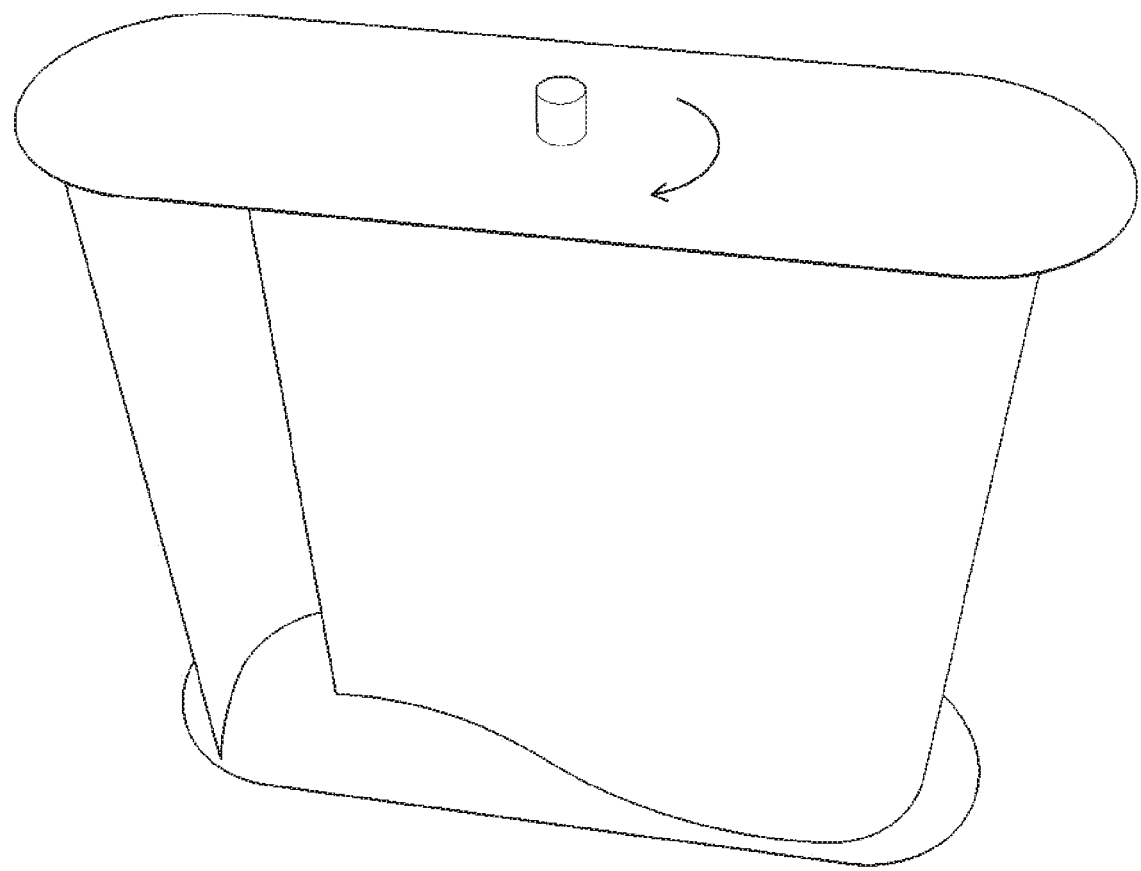
FIG. 11 is a perspective view of a rotor according to another embodiment of the invention.

Although the end caps 4a, 4b are described above as being circular, they may instead be narrowed to follow more closely the envelope formed by the first and second blades 6a, 6b. For example, as shown in FIG. 11, the end caps may be stadium shaped. The rotor 2 may also comprise internal or external bracing to maintain the relationship between the blades 6a, 6b. It will be appreciated that the radius r referred to herein is the radius of the cylindrical volume swept by the blades 6a, 6b and not the radius of the end caps 4a, 4b where this exceeds the radius of the swept area.

In use, the rotor 2 may be coupled to a generator or the like for generating electricity from the wind. Alternatively, the rotor 2 may be coupled to a pump and perform mechanical work.

Figure 12A:
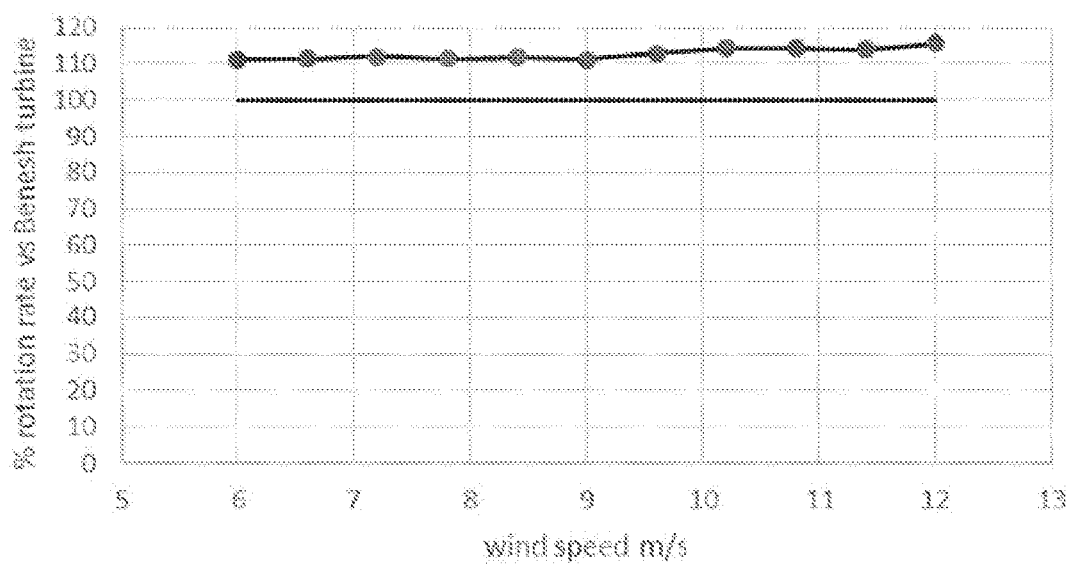
FIGS. 12A and 12B show graphs comparing the performance of the rotor against the prior art rotor design shown in FIG. 1A.
Figure 12B:
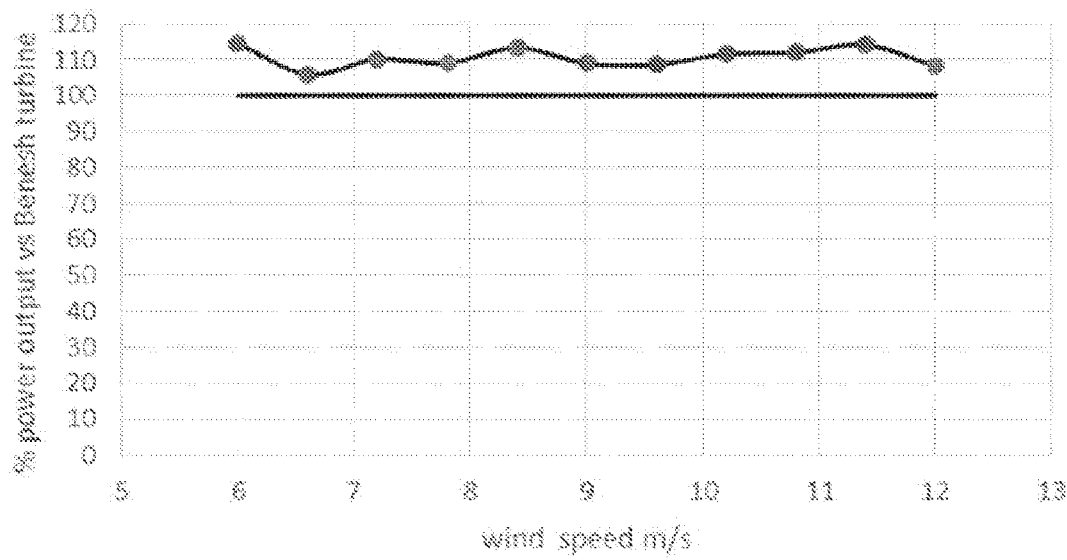

FIGS. 12A and 12B provide a comparison of the performance of the rotor 2 against a prior art rotor as shown in FIG. 1A of equivalent height and diameter. The data is provided from wind tunnel testing of a turbine with the rotor 2 and a turbine with a rotor according to FIG. 1A over wind speeds from 6 to 12 m/s. Both turbines were subjected to equivalent loads.

The results show that the rotor 2 gives a significant improvement, compared to the relatively high efficiency design shown in FIG. 1A, both in terms of rotation rate under no-load conditions, and power output under load (in this case, provided by an electrical generator). The average improvement (across the tested wind speeds) of the rotation rate under no load was 12.65% (with a maximum improvement of 15.8%), whereas the average improvement in the power output under load was 10.55%.

The shape of the present design optimizes torque on the blade and hence power output throughout the rotation of the blade: This is thought to be due to the enhanced external aerofoil shape of the blades, due particularly to the convex sections 20, 20', positioned relative to the rotation axis such that they maximize lift forces when the orientation of the blades (as indicated e.g. by the direction of construction line H in FIG. 8) is in a range either side of parallel to the wind direction, whilst at the same time the uniform width of the internal channel between the blades minimizes turbulence and losses due to expansion/compression for air flowing through that channel, enabling this flow more readily to equalize pressures at the openings 26a and 26b, enhance airflow and lift over the external blade surfaces, and thus provide additional thrust during rotation. The blade shape also directs air so as to facilitate self-starting due to lift and/or drag forces at all angles of the blade to the incident wind direction, and the effectively increased "bucket" size due to the concave sections 22, 22', enhances torque due to drag forces at lower tip speed ratios (the ratio of the blade tip speeds to the wind speed), for example when the blade is under a heavy external load from an electrical generator. These characteristics mean that the blades produce a high torque under a wide range of operating conditions, making them more versatile and hence providing further advantages compared to previous designs.

As described above, the rotor of the present invention provides noticeably higher efficiency, whilst also providing higher buckling resistance and reduced intensity of flicker. These improvements arise as a result of the use of an S-shaped central (i.e. close to the rotation axis) portion of the blades.

It will be appreciated that the above described blade shape represents a preferred embodiment, but that other embodiments are possible within the scope of the present invention, and still giving a measurable improvement in performance (e.g. relative to the blade shown in FIG. 1A).

In particular, it has been found that improved performance may be obtained for rotors having first overlap portions and second overlap portions which both have a radius of curvature which is greater than or equal to the swept radius of the first overlap portions 20 (i.e. —of a radially outermost point of the first overlap portions—referred to as C1swept, as illustrated in FIG. 13. Further, it has been found that even better performance may be obtained for rotors having first overlap portions and second overlap portions which both have a radius of curvature which is greater than or equal to the cylindrical volume swept by the blades, r.

As an illustration, FIG. 14 provides a comparison of rotors with different curvatures for the first and second overlap portions and their performance versus a rotor as shown in FIG. 1A (Benesh) with a planar, parallel sided central section. In example J, the first and second overlap portions both have a radius of curvature which is less than the swept radius of the first overlap portions 20 (0.94 and 0.57 respectively) and less than radius of the cylindrical volume swept by the blades, r (0.82 and 0.5 respectively). The performance is significantly worse than the Benesh rotor of FIG. 1A.

Increasing the radius of curvature of the first and second overlap portions improves performance (see example I); however, a significant improvement over the Benesh rotor is seen when the radius of curvature of the first and second overlap portions are both greater than the swept radius of the first overlap portions 20. In particular, example H provides a 3% improvement in power output over the Benesh rotor.

An increased improvement is also seen when the radius of curvature of the first and second overlap portions are not only both greater than the swept radius of the first overlap portions 20, but also are both greater than the radius of the cylindrical volume swept by the blades, r. In particular, example G provides a 9% improvement in power output over the Benesh rotor.

As shown, the optimum performance is seen with the geometry of the rotor 2 described above (example F). A significant improvement is still seen for larger radiuses, but performance begins to return to that of the Benesh rotor when the radius of curvature of the second overlap portions increases beyond 3r and beyond 4 times C1swept (i.e. beyond example B) and starts to approximate the planar, parallel sided central section of the Benesh rotor.

The first overlap portions 20, 20' may therefore have a radius of curvature which differs from that described above (1.45r—or 1.84 times C1swept). For example, the first overlap portions 20, 20' may have a radius of curvature between 1 and 4.5 times C1swept (preferably, 1.5 to 4.5 or more preferably still, 1.6 to 3.1) or, in terms of the swept radius, between 1r and 3.5r (preferably, 1.2 to 3.3 or more preferably still, 1.3 to 2.3). Similarly, the second overlap portions 22, 22' may have a radius of curvature which differs from that described above (1.13r—or 1.44 times C1swept). For example, the second overlap portions 22, 22' may have a radius of curvature which is between 1 and 4.5 times C1swept (preferably, 1.1 to 4 or more preferably still, 1.2 to 2.7) or, in terms of the swept radius, between 0.9r and 3r (preferably, 1 to 2). Further, although the spacing between blades has been described as being 0.32r it may vary from this. For example, the spacing may be between 0.25r and 0.4r. The spacing between blades may correspond (i.e. be equal) to the difference between the radius of curvature of the first curved section and the radius of curvature of the second curved section. Similarly, the transition section 18 need not have a radius of curvature of 0.3r. For example, the transition section 18 may have a radius of curvature of between 0.1r and 0.5r.

Further, the size of the openings 26a, 26b as defined by the inner edge 14, 14' may vary from that shown. In particular, although the inner edge 14, 14' has been described as being located at approximately 0.65r, it may be at a distance of between 0.5 and 0.8r, for example.

Although the outer section 16 has been described as conforming approximately to the circumference of the rotor, this need not be the case and it may deviate from an arc of a circle. Further, the outer section 16 may have a different length to the 17 degrees of arc described above. For example, it may extend over an arc of between 10 and 25 degrees.

It should also be noted that the curved sections of the blade do not need to be arcs of circles. For example, one or more of these sections may follow other regular curves (e.g. parabolic) or may have a curvature that varies in any non-uniform manner.

The invention is not limited to the embodiments described herein, and may be modified or adapted without departing from the scope of the present invention.

The invention claimed is:

1. A rotor for a vertical axis wind turbine comprising:
    first and second blades connected to one another and arranged to rotate around an axis;
    wherein the first and second blades are disposed 180° apart with respect to one another and are offset from the axis in a radial direction;
    wherein an inner edge of each blade is spaced radially inwardly from an outer edge of the opposing blade to form a pair of diametrically opposed openings which open in opposite directions;
    wherein each of the first and second blades comprises a first curved section and a second oppositely curved section, the first and second curved sections being separated by a point of inflection; and
    wherein the first and second curved sections of the first and second blades overlap one another to form a passageway between the first and second blades which extends between the openings;
    wherein each of the first and second curved sections has a radius of curvature which is greater than or equal to the radius of the cylindrical volume swept by the first curved sections, and
    wherein each of the first and second curved sections has a radius of curvature which is greater than or equal to the radius of the maximum cylindrical volume swept by the blades.

2. A rotor as claimed in claim 1, wherein the passageway has a uniform width along its length.

3. A rotor as claimed in claim 1, wherein the point of inflection of the first blade, the point of inflection of the second blade and the axis of rotation are aligned.

4. A rotor as claimed in claim 1, wherein the first curved section has a radius of curvature which is greater than the radius of curvature of the second curved section.

5. A rotor as claimed in claim 4, wherein the difference between the radius of curvature of the first curved section and the radius of curvature of the second curved section corresponds to a distance between the blades.

6. A rotor as claimed in claim 1, wherein the first curved section has a radius of curvature of between 1 and 4.5 times the radius of the cylindrical volume swept by the first curved sections, or wherein the first curved section has a radius of curvature of between 1.5 and 4.5 times the radius of the cylindrical volume swept by the first curved sections, or wherein the first curved section has a radius of curvature of between 1.6 and 3.1 times the radius of the cylindrical volume swept by the first curved sections, or wherein the first curved section has a radius of curvature of 1.84 times the radius of the cylindrical volume swept by the first curved sections.

7. A rotor as claimed in claim 1, wherein the first curved section has a radius of curvature of between 1r and 3.5r, where r is the radius of the maximum cylindrical volume swept by the blades.

8. A rotor as claimed in claim 7, wherein the first curved section has a radius of curvature of between 1.2r and 3.3r.

9. A rotor as claimed in claim 8, wherein the first curved section has a radius of curvature of between 1.3r and 2.3r.

10. A rotor as claimed in claim 9, wherein the first curved section has a radius of curvature of 1.45r.

11. A rotor as claimed in claim 1, wherein the second curved section has a radius of curvature of between 1 and 4.5 times the radius of the cylindrical volume swept by the first curved sections, or wherein the second curved section has a radius of curvature of between 1.1 and 4 times the radius of the cylindrical volume swept by the first curved sections, or wherein the second curved section has a radius of curvature of between 1.2 and 2.7 times the radius of the cylindrical volume swept by the first curved sections, or wherein the second curved section has a radius of curvature of 1.44 times the radius of the cylindrical volume swept by the first curved sections.

12. A rotor as claimed in claim 1, wherein the second curved section has a radius of curvature of between 0.9r and 3r where r is the radius of the maximum cylindrical volume swept by the blades.

13. A rotor as claimed in claim 12, wherein the second curved section has a radius of curvature of between 1 r and 2r.

14. A rotor as claimed in claim 13, wherein the second curved section has a radius of curvature of 1.13r.

15. A rotor as claimed in claim 1, wherein the blades are spaced by a distance of between 0.25r and 0.4r where r is the radius of the maximum cylindrical volume swept by the blades, or wherein the blades are spaced by a distance of 0.32r where r is the radius of the maximum cylindrical volume swept by the blades.

16. A rotor as claimed in claim 1, wherein each blade comprises an outer section which extends from the outer edge towards the first curved section, the outer section extending circumferentially about the rotor.

17. A rotor as claimed in claim 16, wherein the outer section has an arc length of between 10 and 25 degrees, or wherein the outer section has an arc length of 17 degrees.

18. A rotor as claimed in claim 16, wherein the outer section is connected to the first curved section via a transition section which has a radius of curvature of between 0.1r and 0.5r where r is the radius of the maximum cylindrical volume swept by the blades, or wherein the outer section is connected to the first curved section via a transition section which has a radius of curvature of 0.3r where r is the radius of the maximum cylindrical volume swept by the blades.

19. A rotor as claimed in claim 1, wherein the inner edge is located at a distance of between 0.5 and 0.8r from the axis of rotation where r is the radius of the maximum cylindrical volume swept by the blades, or wherein the inner edge is located at a distance of 0.65r from the axis of rotation where r is the radius of the maximum cylindrical volume swept by the blades.

20. A turbine comprising a rotor as claimed in claim 1, and a generator coupled to a rotor.

* * * * *